March 15, 1938.  E. H. WORTHINGTON  2,111,016

LAWN MOWER

Original Filed March 21, 1934   3 Sheets-Sheet 1

INVENTOR
Edward H. Worthington
BY
John E. Hubbell
ATTORNEY

March 15, 1938. E. H. WORTHINGTON 2,111,016
LAWN MOWER
Original Filed March 21, 1934 3 Sheets-Sheet 2
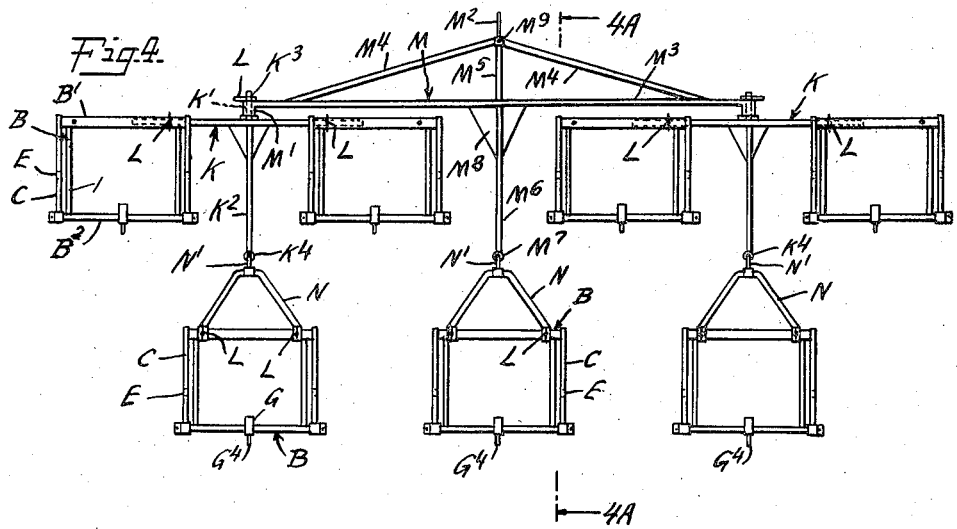
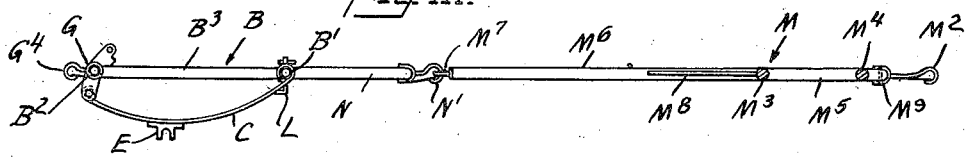
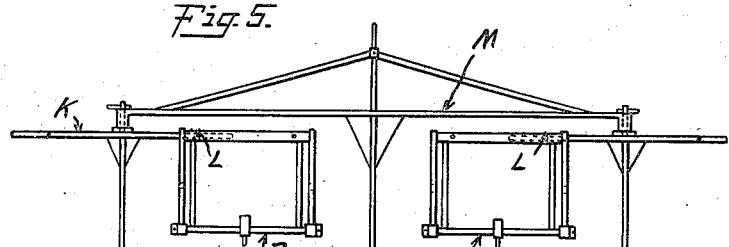
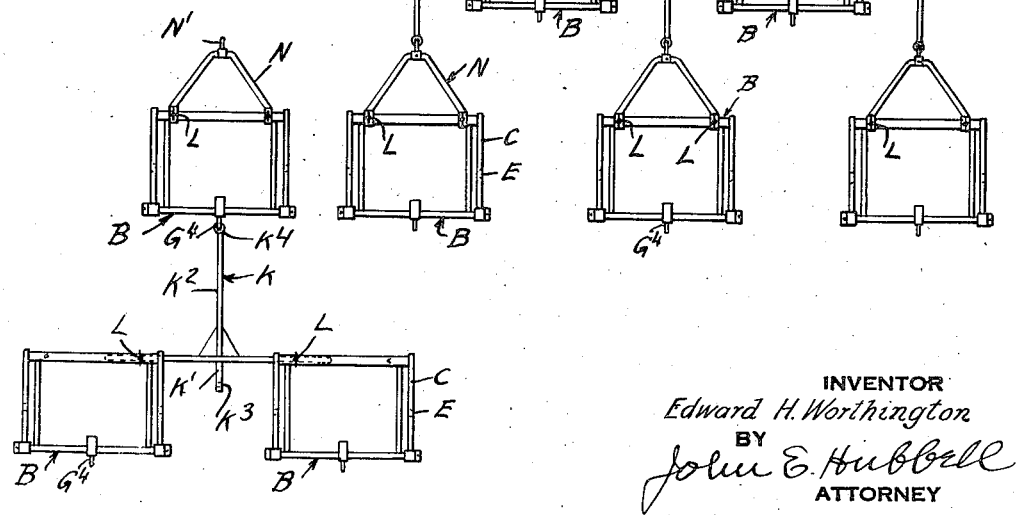
INVENTOR
Edward H. Worthington
BY
John E. Hubbell
ATTORNEY

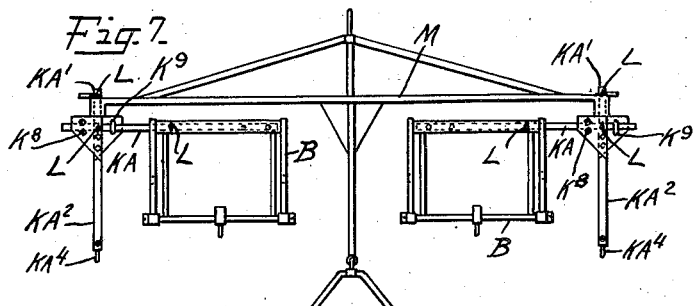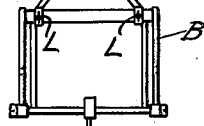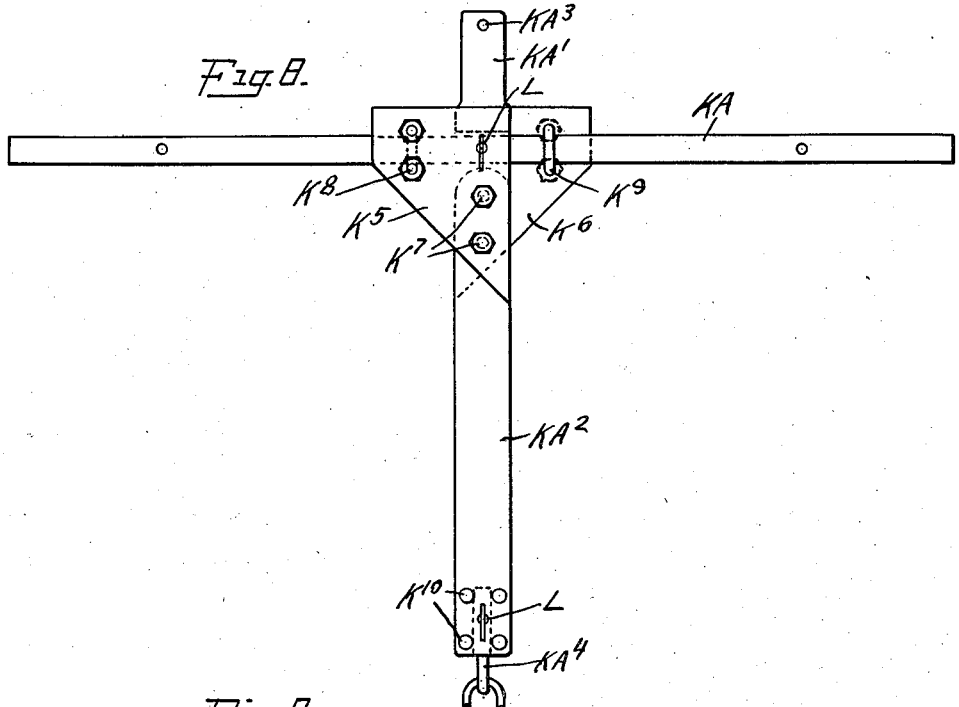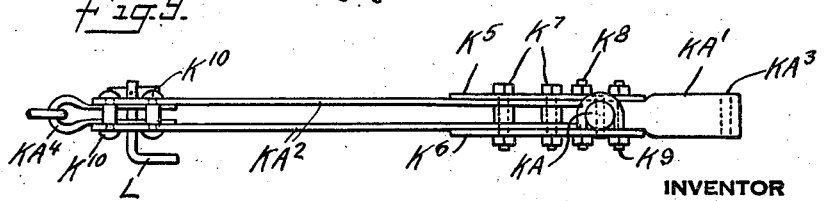

Patented Mar. 15, 1938

2,111,016

UNITED STATES PATENT OFFICE 2,111,016

LAWN MOWER

Edward H. Worthington, Dunfield, N. J.

Application March 21, 1934, Serial No. 716,562
Renewed November 12, 1936

24 Claims. (Cl. 56—7)

The present invention comprises improvements in lawn mowers of the well known type in which the lawn mower includes a framework which is supported by rolling ground engaging wheel or roller elements and which supports a fly knife which is rotated as said elements roll over the ground, and the general object of the invention is to provide such lawn mowers with improved means for connecting them to tractors or other power means for moving them over the ground. A more specific object of the present invention is to provide a lawn mower unit comprising a lawn mower proper and an actuating frame, separate from the framework of the lawn mower and through which the tractive force required to move the lawn mower over the ground is transmitted, and comprising novel and effective means for connecting said actuating frame to the framework of the lawn mower proper.

A further and important object of the invention is to provide such lawn mower units with actuating frames and attachments which are simple in construction, light in weight and relatively small in number, and which may be employed in the rapid and easy assemblage of the lawn mower units into gang mowers including different members of such units, all of which are interchangeably usable in said gang mowers.

My invention is characterized in particular, by provisions whereby a plurality of similar gang mowers may be formed from the units and connecting parts of a single large gang mower, without requiring the use of any units or parts not included in and made use of in said single gang mowers.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated and described a preferred embodiment of the invention.

Of the drawings:

Fig. 4 is a plan view of the frame elements of a gang mower including a plurality of the units shown in Figs. 1, 2 and 3;

Fig. 4A is a section on the line 4a—4a of Fig. 4;

Figs. 5 and 6 are plan views of gang mowers comprising different assemblages of parts included in the gang mower shown in Fig. 4.

Fig. 7 is a plan view of a modified gang mower structure; and

Fig. 8 is a plan view and Fig. 9 is an elevation of connecting parts employed in the gang mower shown in Fig. 7.

Figure 1:
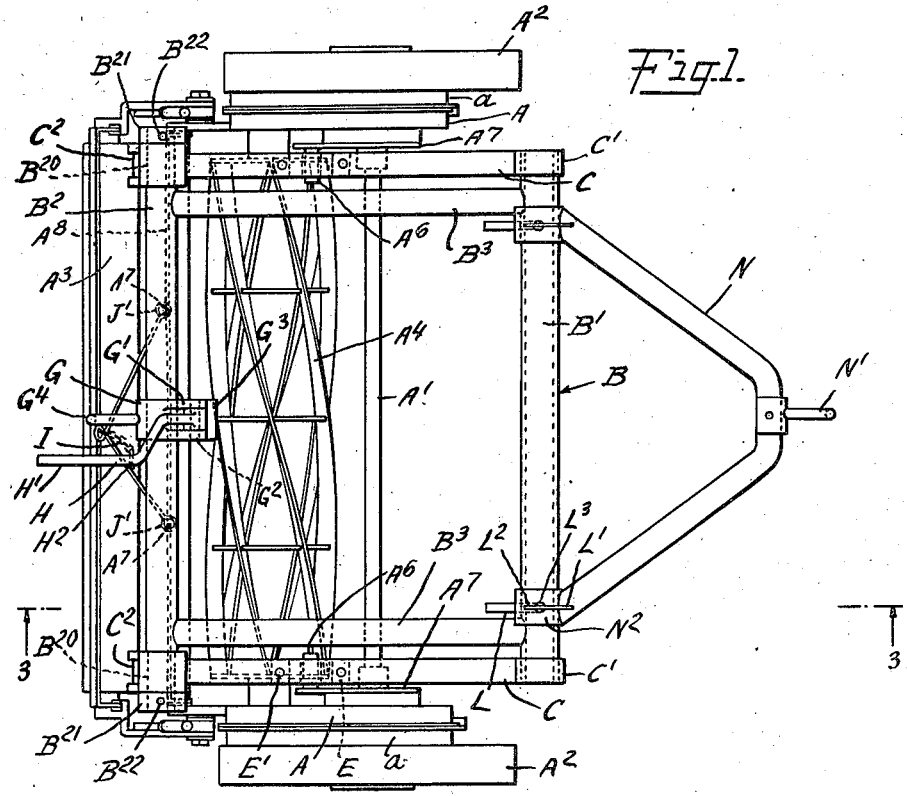
Fig. 1 is a plan view of a lawn mower unit.

The lawn mower unit shown in Figs. 1, 2 and 3 comprises a lawn mower proper, and an actuating frame B through which the force for moving the lawn mower over the ground is applied, and through which the unit may be connected with similar units to form a multiple unit or gang mower as hereinafter described. As shown the lawn mower proper comprises a framework including main side frame members A and $a$, main cross frame members A', and a pair of ground engaging wheels $A^2$ journalled in the respective side frame members A to turn about an axis coaxial, or substantially so, with the cross frame member A'. The lawn mower shown also comprises a trailing ground roller $A^3$, a rotatable fly knife $A^4$ and a non-rotatable bed knife $A^5$, each of which extends between, and is connected at its ends to the side frame members A, the latter being chambered to enclose gearing through which the wheels $A^2$ rotate the fly knife $A^4$.

In respect to its features already referred to, the lawn mower construction illustrated is of a well known and widely used type, and is but one example of the lawn mower types and forms which may be used in the practice of the present invention. It is noted, however, that the lawn mower construction illustrated includes certain features of construction and arrangement to which no reference has been made and which are not essential to the use of the present invention, but which are included in the subject matter disclosed and claimed in my copending applications, Serial No. 701,600, filed Dec. 9, 1933 and Ser. No. 703,170, filed Dec. 20, 1933 which have since matured respectively into Patent 2,049,883, granted August 4, 1936, and Patent 2,079,979, granted May 11, 1937.

For the purposes of the present invention, each side frame member A is provided with a pivot pin or pintle $A^6$ for connecting the lawn mower framework to the actuating frame B. The two pins $A^6$ are in alignment and parallel to the cross frame member A', and at the side of the latter adjacent the ground roller $A^3$, and preferably are at or about the level of the axis of the member A'. As shown the pivot pins $A^6$ are welded or otherwise secured to plate like extensions from members $A^7$ through which the ends of the cross frame member A' are connected to the castings constituting the body portions of the side frames A.

The actuating frame B of the unit comprises front and rear frame members B' and B² parallel to the cross frame member A', and side frame members B³ which are transverse to the members B' and B² and are rigidly connected to the latter adjacent their opposite ends. Advantageously, and as shown, the frame members B', B² and B³ are wrought metal tubes and each member B³ is welded at its opposite ends to the members B' and B². The connection between each pivot pin A⁶ and the adjacent side of the frame B comprises a beam spring C at the outer side of the corresponding frame member B³, and in the form of a spring bar or blade having one end C' curved snugly about the corresponding end of the frame member B', and having its opposite end C² bent around a shackle pin D' carried by a spring shackle member or link D journalled on a corresponding reduced end portion B²⁰ of the frame member B². Each member D is held against longitudinal movement off the corresponding end portion B²⁰ by a collar B²¹ secured to the latter as by means of a cotter pin or rivet B²².

Each spring C is curved or arc shaped with its concave side uppermost, and has secured against its underside as by rivets E', a yoke member E having downwardly extending bifurcations E² which straddle the corresponding pivot pin A⁶. Each yoke is held against movements upward away from the pivot pin A⁶ by a clip or locking pin member F extending beneath the pivot pin through apertures formed for the purpose in the bifurcations E². The bifurcations E² of each member E are spaced apart and the portions of the bifurcations above the locking member F are of such length, as to provide a little lost motion between each member E and the corresponding pivot A⁶ in the assembled condition of the apparatus.

In ordinary operation the connection of the frame B to the tractor or other apparatus employed to move the unit over the ground tends to maintain the actuating frame B of the unit in a generally horizontal position. In some cases, as in moving across a road or ditch, or in moving through grass which is not being cut, it is desirable to raise all portions of the unit, except the wheels A², well above the ground level. This may be accomplished by the provisions shown, for suspending the rear portion of the lawn mower proper from the rear member B² of the frame B. To this end a part G is secured on the member B² midway between its end. As shown the member G comprises a hub like portion which surrounds the member B² and may be welded to the latter. The part G comprises an arm G¹ extending upwardly and forwardly from its hub portion and slotted at its free end to receive the end of a lever H which is pivotally connected to the arm G¹ by a pivot pin G². The free end of the lever H terminates in a handle portion H' and intermediate its ends it is provided with an eye H² or the like for the attachment of a flexible suspension element, shown as a chain I, which has its lower end suitably connected to the rear portion of the lawn mower framework. As shown, the connection comprises a bail like part J having its yoke connected to the chain I, and portions J' at its lower ends, which, as shown, extend through apertures A⁷ formed for the purpose in an auxiliary cross frame member A⁸, the latter being connected at its ends to the lawn mower side frame member A and being located at the rear side of the bed knife A⁵.

Figure 2:
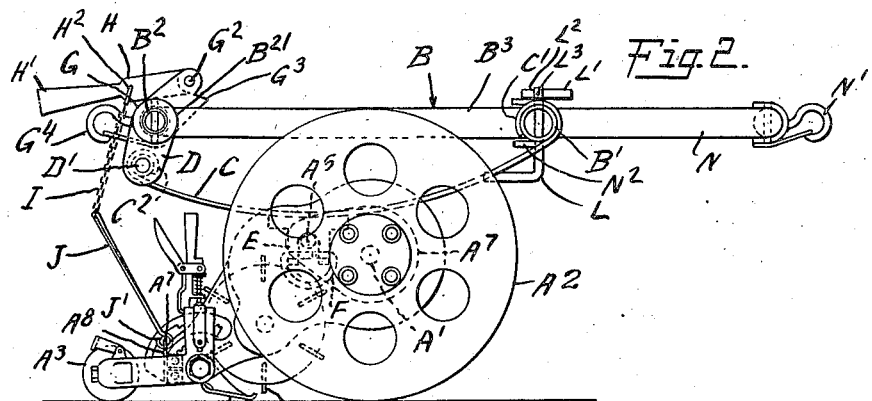
Fig. 2 is a side elevation.

In the normal operating condition of the lawn mower the handle H is turned back as shown in full lines in Figs. 1 and 2, and the chain I is then slack so that it does not interfere with the vertical relative movements of the rear portion of the lawn mower and the frame B, normally occurring as the lawn mower is moved over the ground with the roller A³ in contact therewith. When the lever H is turned forward into the position shown in full lines in Fig. 3, however, the chain I is pulled upward over the frame member B² so that the rear portion of the lawn mower including the roller A³, fly knife A⁴ and the bed knife A⁵ are then suitably raised above the ground level. In its position shown in Fig. 3, the lever H engages a supporting shoulder G³ at the forward end of the arm G¹, and the portion of the chain I extending between the hook H² and the frame member B² is then at the underside of the pivot G² so that the pull of the chain on the lever H holds the latter against the shoulder G³ and prevents the lever from turning backward into its full line position.

As shown the lever H is off-set between its ends so that its connection with the chain I is displaced to one side of the vertical center plane of the part G. In consequence, the chain I is displaced to one side of a rearwardly extending hook, clevis or other connecting part G⁴ of the member G which is located centrally of the unit and is employed in some cases, as hereinafter explained, to connect the unit to a trailing unit of a gang lawn mower. As shown the part G⁴ is a hook provided with a spring tongue g for detachably holding in place the trailing unit part received in the hook.

Each lawn mower unit is moved over the ground through suitable propelling connections to the front member B' of its actuating frame B. Those connections may take various forms, some of which are used in the desirable form of a seven unit gang lawn mower shown in Fig. 4, in which as in Figs. 4A, 5 and 6 only the actuating frame elements of the different units are shown. The gang lawn mower shown in Fig. 4 comprises four aligned front units and three aligned rear or trailing units, each of the latter normally serving to cut the grass between the swaths cut by a corresponding pair of front line units which are spaced apart so that the adjacent ends of their fly knives overlap the end portions of the fly knife of the corresponding rear or trailing unit. Each of the two end front line units and the immediately adjacent front line unit have their frames B connected by a corresponding bar like part K which may be tubular and has its opposite ends telescopically received in the tubular front frame members B' of the corresponding frames B. Each bar part K received in a frame member B is detachably secured to the latter by a corresponding locking part L passing through openings formed for the purpose in the member B' and part K.

Figure 3:
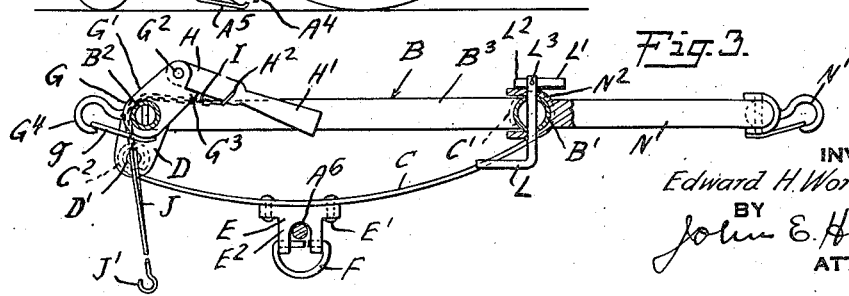
Fig. 3 is a section through the actuating frame taken on the broken line 3—3 of Fig. 1.

A preferred construction of the locking parts L is shown in Figs. 1, 2 and 3, wherein such locking parts are employed to connect the hereinafter mentioned member N to an actuating frame member part B'. As shown in Figs. 1, 2 and 3, the locking member L comprises a body portion in the form of a rod having an off-set head portion at one end and bifurcated at its opposite end, with a blade L'—L² extending between the bifurcations and connected to the latter by a pivot pin $L^3$, the portion $L^1$ of the blade $L'$—$L^2$ at one side of the pivot being longer than the portion $L^2$ at the other side of the pivot. The blade and body portions of each member L may be turned into alignment for movement through registering openings in the parts to be connected. When the blade is thereafter turned into the transverse position shown in Figs. 1, 2 and 3, the greater length of the blade portion $L^1$ tends to prevent accidental realignment of the blade and body portions of the locking member, regardless of whether the body portion is then horizontal or vertical, though the parts of the member L may be easily manipulated for removal whenever desirable.

Midway between its ends each bar K has rigid horizontal extensions $K^1$ and $K^2$ at its front and rear sides, respectively. The extensions $K^1$ at the front sides of the two bars K of the gang mower shown in Fig. 4 extend through and are journalled in socket $M^1$ formed for the purpose at the ends of a connection member M, and are removably secured in said sockets by locking members L like those previously described, and each of which passes through an opening in the end portion of the corresponding extension $K^1$. At its front side and midway between its ends, the member M is equipped with a hook or clevis $M^2$ whereby the member M may be connected to a tractor or other lawn mower propelling apparatus. The part $M^2$ is shown as a hook like the part $G^4$ previously described. To insure adequate strength and rigidity while keeping its weight desirably small, the member M is advantageously made in the form of a truss comprising a main chord member $M^3$ and a bent tension member $M^4$ with a connecting strut portion $M^5$ extending between the two members in line with the hook $M^2$ and with a rear extension $M^6$ which terminates at its rear end in an eye $M^7$ for the attachment of the central rear or trailing lawn mower unit. As shown the connection of the parts $M^6$ and $M^3$ is strengthened and stiffened by gusset plates $M^8$. The parts $M^3$, $M^4$, $M^5$ and $M^6$ are advantageously of tubular or angle bar section, and all portions of the member M are advantageously welded together with the exception of the hook member $M^2$ which may be secured in place by a locking pin $M^9$.

At its rear end, the rear extension $K^2$ of each part K is formed with an eye $K^4$ similar to the eye $M^7$ at the rear end of the extension $M^6$. The three eyes $K^4$, $M^7$ and $K^4$ are arranged in a row, and each receives a hook or clevis $N'$ riveted or otherwise secured to the central portion of a yoke or bail part N having leg end portions $N^2$ detachably connected to the front member $B'$ of the frame B of the corresponding trailing lawn mower unit. As shown in Fig. 3, each leg end portion $N^2$ is bifurcated and shaped to provide a cylindrical seat receiving a corresponding cylindrical portion of the frame member $B'$ and is secured to the latter by a locking pin L. Advantageously the end portions $N^2$ of each member N are spaced apart so that the corresponding locking pins L may pass through the same holes in a frame member $B'$ which receives locking pins L when that frame member $B'$ is attached to a part K, as is desirable to permit interchangeable use of the different lawn mower units, all of which include actuating frames B which may be identical in form.

With the arrangement shown in Fig. 4, and on the assumption that the hook $M^2$ of the first connector part M is connected to a tractor or the like fixing the elevation of the hook $M^2$ above the ground, it will be apparent that the framework collectively formed by the members K and M and the lawn mower frames B directly connected to the members K, is maintained in generally parallel relation with the surface of the ground over which the units are moved, but may tilt in all directions as required to accommodate variations from the horizontal of the portion ground surface directly beneath the gang mower and the tractor employed to move it. While, except for the pivotal connections between the members M and K, said framework is relatively rigid, its described form gives it a certain flexibility which minimizes shocks and maximum stresses resulting from the engagement of any of the units connected thereto with ground irregularities or obstructions. The shocks or jars so imparted to the lawn mower framework of any units of the gang mower, are largely absorbed, however, and their consequences minimized, by the flexible resilient connections including the spring C between the lawn mower framework and actuating frame B of each unit. Each member K is free to tilt relative to the plane of the frame M about the axis of its extension K journalled in the corresponding socket $M'$. The connections between the eyes $K^4$ and $M^7$ and the hooks $N^1$ permit the actuating frames B of the trailing units to tilt relative to the framework including the parts K and M.

As will be apparent each actuating frame is supported mainly through its springs C by the framework of the corresponding lawn mower, and the weight or load on the lawn mower framework of each unit is so applied to the latter through its pintles $A^6$, which are located between the common axis of its wheels $A^2$ and the axis of the ground roller $A^3$, that the wheels and roller are thereby held in contact with the ground under conditions momentarily tending to cause one of those rolling supporting elements to lift or jump off the ground. The lawn mower unit connecting and propelling means, including the frames B of the members K and M and other connecting parts may be made so relatively light in weight and are so associated with the framework portions of the individual mower units, that there is no need to employ auxiliary connection frame supporting ground wheels, such as are employed in various existing gang mowers.

As will be apparent, a five unit gang mower may be formed as shown in Fig. 5 from the seven unit mower shown in Fig. 4, by disconnecting from the latter its two end front units.

It is readily possible also, to form two gang mowers of three units from the seven unit mower shown in Fig. 4, and without requiring the use of any parts not employed in Fig. 7. One of the three unit gang mowers which may be so formed from the seven unit mower of Fig. 4 is shown in Fig. 6. The operations required for forming the three unit mower shown in Fig. 6 from the seven unit mower of Fig. 4 are as follows:—One connecting part K is disconnected from the connecting part M and from the corresponding trailing unit, then the locking pins L attaching the bar K to the frame members $B'$ are removed and replaced after rotating the bar K through an angle of 180°, and the eye $K^4$ of the extension $K^2$ from the bar K is then attached to the rear hook $G^4$ of the disconnected trailing lawn mower unit. The latter then becomes the single front unit of the three unit mower shown in Fig. 6. The three unit gang mower thus formed may be propelled by connecting the hook N' of the front unit to a tractor or other propelling device. In the three unit mower shown in Fig. 6, the considerable length of the extension $K^2$ from the bar K, spaces the single front unit sufficiently far in advance of the two trailing units to permit of relatively sharp corner turns, as is especially desirable in the case of a gang mower comprising but three lawn mower units.

The manner in which the units may be assembled and reassembled to form one seven unit gang mower as shown in Fig. 4, or two such three unit mowers as is shown in Fig. 6, is a practically important advantage of the present invention. In the upkeep of golf courses and analogous work constituting the principal field of use of the invention, a seven unit gang mower is a desirable maximum size mower and may be used for much of the work to be done, but a considerable portion of the work may be done most advantageously with a three unit gang mower. The work done with a three unit mower obviously may be done more expeditiously, and more effective use of the available equipment be had, if done by two three unit mowers than if done by one such unit formed out of the seven unit mower, when the use of the latter is temporarily interrupted. From the practical standpoint, however, whether to do three unit mower work with one or two mowers will depend frequently upon the time and trouble required for the conversion of the seven unit mower into the three unit mower or mowers. With my invention, as will be apparent to those skilled in the art, two three mower units can be very quickly and easily formed out of the seven unit mower, in the field and without the use of special tools or additional connecting parts. While it is not novel with me to provide a seven unit mower from which a single three unit mower may be readily formed without special tools or additional equipment, I believe I am the first to provide a seven unit mower from which two three unit mowers may be formed quickly without the use of parts not included in the seven mower unit.

When two three unit gang mowers, each of the form shown in Fig. 6, are assembled from the parts of such a seven unit mower as is shown in Fig. 4, the front connecting part member M is the only part of the seven unit mower which needs to be rendered temporarily inoperative, as the one trailing lawn mower unit of the Fig. 4 mower not included in the two three unit mowers is available for use as a single tractor propelled mower when conditions make such use desirable.

In lieu of forming a three unit gang mower out of the parts of the gang mower of the seven unit mower shown in Fig. 4, in the mower previously described, a three unit mower may be formed from the mower of Fig. 4 by disconnecting the two end front line units, as in forming the five unit mower shown in Fig. 5, and also disconnecting the two end units of the rear row. In the mower shown in Fig. 5, the remote ends of the two members K project laterally at the opposite sides of the path or ground strip along which the individual lawn mower units travel. Such extension of the members K is not practically objectionable in many cases, but in some cases, as where the mower is used to cut grass between rows of trees, such extension of the members K is objectionable. The lateral extension of the members K beyond the path followed by the lawn mower units is more pronounced, of course, when a single three unit mower is formed from the mower of Fig. 4 by simply disconnecting the end units of the front and rear rows as above described. A three unit gang mower formed by disconnecting units of a seven or five unit mower as above described is shown in Fig. 7.

The lateral extension of the members K beyond the sides of the path followed by the lawn mower units of a gang mower may be eliminated in the case of a five unit gang mower, and may be materially reduced in the case of a three unit mower of the last mentioned type, by the use of the special connection parts illustrated in Figs. 7, 8 and 9. A three unit mower is shown in Fig. 7 which differs from that which may be formed from the five unit mower shown in Fig. 5 by disconnecting the two rear row end units of the latter essentially only in that in Fig. 7 the previously mentioned members K are replaced by the members KA each of which is longitudinally adjustable relative to the parts KA' and $KA^2$, which correspond to the parts $K^1$ and $K^2$ of the construction previously described. For use in a seven unit mower of the character shown in Fig. 4, each member KA projects laterally for the same distance at each side of the center line of the corresponding parts KA' and $KA^2$. For use in a five unit mower or in a three unit mower as shown in Fig. 7, each member KA is displaced relative to the corresponding parts KA' and $KA^2$ toward the longitudinal center line of the gang mower.

As shown in Figs. 7, 8 and 9, the described longitudinal adjustment of each member KA is made possible by providing a connection between the corresponding members KA' and $KA^2$ which includes a socket or guideway for the member KA, in which the latter may be clamped in its different longitudinal adjustments. The said connection as shown includes gusset plates $K^5$ and $K^6$, respectively, above and below the parts KA, KA' and $KA^2$. As shown the member KA' is in the form of a round bar having a flattened end portion extending between and welded to the plates $K^5$ and $K^6$, and is formed with a locking pin hole $KA^3$, corresponding to the hole $K^3$ of the part $K^1$. The part $KA^2$ might be welded or riveted to the plates $K^5$ and $K^6$, but to facilitate shipping and packaging for shipping, the part $KA^2$ is detachably connected to the plates by bolts $K^7$.

While the plates $K^5$ and $K^6$ have overlapping portions respectively above and below the parts KA' and $KA^2$, the plate $K^5$ projects laterally from the members KA' and $KA^2$ only to the left of the latter as seen in Figs. 7 and 8, and the plate $K^6$ projects laterally from the parts KA' and $KA^2$ only to the right as seen in those figures. This disposition of the plates permits the members KA to be detachably clamped to the plates $K^5$ and $K^6$ by a U bolt $K^8$ having its yoke in engagement with the underside of the members KA and its legs extending through the plate $K^5$, and a U bolt $K^9$, like the U bolt $K^8$ reversed in position, so that its yoke bears against the upper side of the members KA and its legs pass downward through the plate $K^6$.

To facilitate the accurate longitudinal adjustment relative to the parts KA' and $KA^2$ of the part KA into its different positions shown in Figs. 7 and 8, the plates $K^5$ and $K^6$ are advantageously formed with aligned holes for a locking pin L which passes through a central hole formed for the purpose in the part KA when the latter occupies the position shown in Fig. 8, and which passes through the hole in the part KA employed for the attachment of the actuating frame of a lawn mower unit of the unit mower which is disconnected from the member KA in forming the five unit mower shown in Fig. 7.

With the parts adjusted as shown in Fig. 7, each member KA extends into the bore of the frame member B' of the lawn mower actuating frame unit connected thereto, for substantially the full length of said member B' and its connection to the latter is correspondingly strengthened and stiffened.

In the particular construction shown in Figs. 8 and 9, the member KA² consists of two spaced apart flat bars connected at their ends remote from the member KA by spacing and connecting rivets K¹⁰, bolts K⁷ being provided to insure the proper separation of the bars at their opposite ends. As shown the part KA⁴ provided at the rear end of the part KA² for its attachment of a trailing unit is in the form of a clevis KA⁴ having its end portions extending between the rivets K¹⁰ and detachably connected to the member KA² by a locking pin L. As will be apparent, members KA when connected to the corresponding parts KA' and KA² in the relative positions of the parts as shown in Fig. 8, may be used in lieu of the members K with their projections K¹ and K², in the assembly of a seven unit mower as shown in Fig. 4, or in the assembly of two three unit mowers as shown in Fig. 6.

While in accordance with the provisions of the statutes I have illustrated and described the best form of embodiment of my invention now known to me, it will be apparent to those skilled in the art that changes may be made in the form of the apparatus disclosed without departing from the spirit of my invention as set forth in the appended claims and that in some cases certain features of my invention may be used to advantage without a corresponding use of other features.

Having now described my invention, what I claim as new and desire to secure by Letters Patent is:

1. A lawn mower unit comprising a lawn mower framework, rolling ground engaging elements journalled in said framework and supporting the latter, cutting means mounted in said framework, an actuating frame, and resilient connections between said frame and framework through which said frame is supported by said framework and the lawn mower propelling force is transmitted to said framework.

2. A lawn mower unit comprising a lawn mower framework, rolling ground engaging elements journalled in said framework and supporting the latter, cutting means mounted in said framework, an actuating frame and a beam spring connected at its ends to front and rear portions of said frame and connected intermediate its ends to a portion of said framework.

3. A lawn mower unit comprising a lawn mower framework, rolling ground engaging elements journalled in said framework and supporting the latter, cutting means mounted in said framework, an actuating frame and a beam spring adjacent each side and connected at its ends to front and rear portions of said frame and connected intermediate its ends to a portion of said framework.

4. A lawn mower unit comprising a lawn mower framework, a pair of ground engaging wheels journalled in said framework, a ground roll journalled in said framework to turn about an axis laterally displaced from the axes of said wheels, a cutting mechanism mounted in said framework, an actuating frame and beam spring means connected to and extending between front and rear portions of said frame and having a portion intermediate said portions connected to said framework intermediate said axis and said axes.

5. A lawn mower unit comprising a lawn mower framework including side frames, a pair of ground engaging wheels journalled in said framework at opposite sides of the latter, a ground roll journalled in said framework to turn about an axis laterally displaced from the axes of said wheels, a cutting mechanism mounted in said framework, an actuating frame and a pair of spring beams adjacent the opposite sides of said frame and each connected at its ends to front and rear portions of said frame, and each pivotally connected intermediate its ends to a portion of the adjacent side frame between said axis and said axes.

6. A lawn mower unit comprising a lawn mower framework, a pair of ground engaging wheels journalled in said framework at opposite sides of the latter, a ground roll journalled in said framework to turn about an axis laterally displaced from the axes of said wheels, a cutting mechanism mounted in said framework, a pair of aligned pintles carried by said frame respectively one adjacent each side of the latter and each located between said axis and said axes, an actuating frame, and a pair of spaced apart beam springs each connected at its ends to front and rear portions of said frame and each pivotally connected intermediate its ends to the corresponding one of said pintles.

7. A lawn mower unit comprising a lawn mower framework, ground engaging wheels journalled in said framework, a ground roller journalled in said framework to turn about an axis horizontally displaced laterally from the axes of said wheels, cutting means mounted in said framework, an actuating frame having front and rear portions at each side extending parallel to said axes, a beam spring at each side of said frame having its front end connected to the rear frame portion at the corresponding side of said frame, and a pivotal connection between an intermediate portion of each spring and a portion of said framework intermediate said axis and said axes.

8. A lawn mower unit comprising a lawn mower framework, rolling ground engaging elements journalled in said framework and supporting the latter, cutting means mounted in said framework, an actuating frame comprising a longitudinal portion and front and rear portions extending transversely to said longitudinal portion at each side of said frame, a beam spring at each side of said frame connected at its ends to the corresponding front and rear frame portions and connected intermediate its ends to said framework.

9. A lawn mower unit comprising a lawn mower framework, roller ground engaging elements journalled in said framework and supporting the latter, cutting means mounted in said framework, an actuating frame, a pair of spaced spring beams extending transversely to the axes of said rolling elements and each connected at its front end to an adjacent portion of said frame, a shackle connection between the rear end of each beam and a rear portion of said frame comprising a link member pivotally connected at one end to said frame and pivotally connected at its other end to said beam, and a connection between the lawn mower framework and each beam intermediate the ends of the latter.

10. A lawn mower unit adapted for use as a leading or trailing unit of a gang lawn mower and comprising a lawn mower framework, rolling ground engaging wheels journalled in said framework and supporting the latter, cutting means mounted in said framework, an actuating frame, resilient connections between said frame and framework through which said frame is supported by said framework and the lawn mower propelling force is transmitted to said framework, said frame comprising a transversely extending front portion and means for interchangeably securing thereto leading and trailing unit connecting members.

11. A lawn mower unit adapted for use as a leading or trailing unit of a gang lawn mower comprising a lawn mower framework, rolling ground engaging wheels journalled in said framework and supporting the latter, cutting means mounted in said framework, an actuating frame, resilient connections between said frame and framework through which said frame is supported by said framework and the lawn mower propelling force is transmitted to said framework, said frame comprising transversely extending front and rear portions and means for interchangeably securing to said front portion leading and trailing unit connecting members, and trailing unit connecting means secured to said rear portion.

12. A lawn mower unit comprising a lawn mower framework, rolling ground engaging elements journalled in said framework and supporting the latter, cutting means mounted in said framework, an actuating frame comprising transversely extending front and rear portions, a beam spring at each side of said frame connected at its ends to said front and rear portions and connected intermediate its ends to said framework, means connected to said rear portion for detachably connecting the latter to the trailing unit of a gang lawn mower of which the first mentioned unit forms a leading unit, and means for interchangeably connecting to the front portion of said frame, leading and trailing unit connection members to adapt the first mentioned unit for use as a leading or trailing unit, respectively, of a gang lawn mower.

13. A lawn mower unit comprising a lawn mower framework, rolling ground engaging elements journalled in said framework and supporting the latter, cutting means mounted in said framework, an actuating frame, and resilient connections between said frame and framework through which said frame is supported by said framework and the lawn mower propelling force is transmitted to the latter, said frame including a transversely extending tubular front portion formed with two locking pin apertures one at each side of and similarly spaced away from the longitudinal center line of the unit whereby the two apertures may be utilized in connecting said unit to a member individually connecting said unit to lawn mower propelling means and whereby either aperture may be utilized in securing in said tubular portion a connecting member inserted in the corresponding end of the latter and adapted for use in connecting the unit to another lawn mower alongside the first mentioned unit, and to connect both of said units to lawn mower propelling means.

14. The combination with three lawn mower units, of a unit connecting member including a beam with a transverse extension intermediate its ends, means for interchangeably connecting two of said units to the opposite end portions of said beam with said extension extending either rearwardly between the last mentioned units or extending forwardly from the latter, and means for connecting the third unit to the end of said extension in either position of the latter.

15. The combination with three lawn mower units, of a unit connecting member including a beam with a transversely extending arm intermediate its ends and means for interchangeably connecting said member and units in either of two ways, in each of which two of said units are connected to the opposite end portions of said beam and in one of which said arm extends forwardly from the last mentioned units and is connected to the third unit which then forms the leading unit of a three unit gang mower, and in the other of which said arm extends rearwardly between the two units connected to said beam, and is connected to said third unit which then forms a trailing unit.

16. The combination with three lawn mower units, of a connecting member comprising a beam with oppositely extending transverse extensions intermediate its ends, and means for interchangeably connecting said members and beam in two ways in each of which two of said units are connected to the oposite end portions of said beam and in one of which one of said extensions projects forwardly from the last mentioned units and is connected to the rear end of the third unit thereby forming a three unit gang mower with the two units connected to said beam trailing said third unit and in the other of which the last mentioned extension extends rearwardly between the units connected to the beam and is connected to said third unit which then becomes a trailing unit, the other of said extensions being then adapted for connection to means for propelling the three units over the ground.

17. The combination with three lawn mower units, of a unit connecting member including a beam with oppositely extending transverse extensions intermediate its ends one of which is longer than the other, and means for interchangeably connecting said units and members in either of two ways in each of which two of said units are connected to the opposite end portions of said beam, and in one of which said arm extends rearwardly between the last mentioned units and has its ends connected to the rear unit to thereby form a gang mower section which may be advanced by a tractive force applied to the shorter of said arms and in the other of which the longer arm projects forwardly from the units connected to said beam, and has its ends connected to the third unit to thereby form a three unit gang mower of which said third unit is the leading unit.

18. The combination with two lawn mower units each having a transversely extending part, of a unit connecting member including a beam with end portions in telescopic engagement with said parts and an arm extending transversely from the beam intermediate its ends, and means for interchangeably connecting said beam and unit parts in either of two relative positions in one of which said arm extends forwardly from said units and in the other of which the arm extends rearwardly between said units, a third unit and means for connecting said third unit to said arm in front of or at the rear of said arm accordingly as the latter is in one or the other of said positions.

19. The combination with two lawn mower units each having a transversely extending part, of a unit connecting member including a beam with end portions in rotatable and telescopic engagement with said parts and an arm extending transversely from the beam intermediate its ends and means for interchangeably securing said beam and parts in either of two relative positions, and in one of which said arm extends forwardly from said units and in the other of which the arm extends rearwardly between said units, a third unit and means for connecting said third unit to and in front of or at the rear of said arm accordingly as the latter is in one or the other of said positions.

20. A gang lawn mower comprising two similar connecting members each of which comprises a beam and long and short transverse arms extending in opposite directions away from an intermediate portion of said beam, a third connecting member to spaced apart portions of which the shorter arms of the first mentioned member are detachably connected with the two beams in alignment, four lawn mower units arranged side by side in a row each adjacent and detachably connected to a corresponding one of the four end portions of the two beams, and a trailing lawn mower unit detachably connected to the rear end of each of said longer arms, each first mentioned member and the three units detachably connected thereto including provisions for their reassembly, when said member is disconnected from said third member, into a three unit gang mower comprising one leading unit and two trailing units, the latter being connected to the opposite end portions of said beam, which then has its long arm extending forwardly from the trailing units and connected to the third and leading unit.

21. A gang lawn mower comprising two similar connecting members each of which comprises a beam and long and short transverse arms extending in opposite directions away from an intermediate portion of said beam, four lawn mower units each connected to a corresponding end portion of a corresponding one of said beams with the longer arm of the beam extending rearwardly between the two units connected thereto, a third connecting member to which the shorter arms of the first mentioned members are detachably connected with said four units in side by side relation, a trailing lawn mower unit detachably connected to the rear end of each of said longer arms, each mentioned member and the three units detachably connected thereto including provisions for their reassembly, when said member is disconnected from said third member, into a three unit gang mower comprising one leading unit and two trailing units, the latter being connected to the opposite end portions of the beam portion of the member, and the third and leading unit being connected to the end of the longer arm extension from said beam which then extends forwardly from the trailing unit.

22. A gang mower comprising a plurality of lawn mower units arranged in front and rear rows and each comprising a lawn mower proper including a rigid framework, an actuating frame and resilient connections through which said frame is supported by said framework and the lawn mower propelling force is transmitted to the latter, a connection framework to which the actuating frames of the front row units are rigidly connected and which includes rearwardly extending members to which the actuating frames of the rear row units are connected.

23. A gang mower comprising a plurality of lawn mower units arranged in front and rear rows and each comprising a lawn mower proper including a rigid framework, an actuating frame and resilient connections through which said frame is supported by said framework and the lawn mower propelling force is transmitted to the latter, a connection framework to which the actuating frames of the front row units are rigidly connected and which includes rearwardly extending members and universal joint connections between each of said members and the actuating frame of a corresponding rear row unit.

24. A unit connecting member for gang lawn mowers comprising different assemblages of lawn mower units, said members comprising forwardly and rearwardly extending portions and a bar extending transversely of and longitudinally adjustable relative to said portions, and means for securing said portions to said bar in different longitudinal adjustments of the latter, said bar being adapted to advance two units one connected to each end of the bar in one longitudinal adjustment of the latter, and to advance a single unit connected to one end of the bar in a different longitudinal adjustment of the latter, and to space the unit or units connected thereto relative to a unit or units which may be connected to either of said portions.

EDWARD H. WORTHINGTON.